US012610006B2

(12) United States Patent
Nordlund

(10) Patent No.: US 12,610,006 B2
(45) Date of Patent: Apr. 21, 2026

(54) PERSONAL SAFETY SYSTEM

(71) Applicant: Run Segura LLC, Greenwood, SC (US)

(72) Inventor: Randy Nordlund, Greenwood, SC (US)

(73) Assignee: Run Segura LLC, Greenwood, SC (US)

( * ) Notice: Subject to any disclaimer, the term of this patent is extended or adjusted under 35 U.S.C. 154(b) by 387 days.

(21) Appl. No.: 18/223,367

(22) Filed: Jul. 18, 2023

(65) Prior Publication Data

US 2025/0030791 A1     Jan. 23, 2025

(51) Int. Cl.
| | |
|---|---|
| *H04M 1/72421* | (2021.01) |
| *G10L 15/08* | (2006.01) |
| *H04M 1/72409* | (2021.01) |
| *H04M 1/72433* | (2021.01) |
| *H04M 1/72457* | (2021.01) |
| *G10L 15/22* | (2006.01) |

(52) U.S. Cl.
CPC ......... *H04M 1/72421* (2021.01); *G10L 15/08* (2013.01); *H04M 1/724094* (2022.02); *H04M 1/72433* (2021.01); *H04M 1/72457* (2021.01); *G10L 2015/088* (2013.01); *G10L 15/22* (2013.01); *H04M 2201/40* (2013.01)

(58) Field of Classification Search
CPC ....... H04M 1/72421; H04M 1/724094; H04M 1/72433; H04M 1/72457; H04M 2201/40; G10L 15/08; G10L 15/22; G10L 2015/088
See application file for complete search history.

(56) References Cited

U.S. PATENT DOCUMENTS

| | | | | |
|---|---|---|---|---|
| 11,688,260 B1 * | 6/2023 | Magaletta | .......... | G08B 21/0288 |
| | | | | 340/539.13 |
| 2009/0227223 A1 * | 9/2009 | Jenkins | ................ | H04M 11/045 |
| | | | | 455/404.1 |
| 2010/0093405 A1 * | 4/2010 | Ewell, Jr. | ................ | H04M 1/66 |
| | | | | 455/566 |
| 2011/0205057 A1 * | 8/2011 | Sizemore | ............. | G08B 15/004 |
| | | | | 340/568.6 |
| 2012/0028600 A1 * | 2/2012 | Vallaire | .................. | G08B 27/00 |
| | | | | 455/404.2 |
| 2013/0132095 A1 * | 5/2013 | Murthi | .................. | G06F 1/3234 |
| | | | | 704/E11.001 |
| 2016/0109953 A1 * | 4/2016 | Desh | ........................ | G06F 3/011 |
| | | | | 345/169 |
| 2016/0344918 A1 * | 11/2016 | Tao | ........................ | H04N 23/63 |
| 2022/0345869 A1 * | 10/2022 | Ahrens | ................ | H04W 4/029 |
| 2024/0029541 A1 * | 1/2024 | Millican | ............. | G08B 29/186 |

* cited by examiner

*Primary Examiner* — Farid Seyedvosoghi
(74) *Attorney, Agent, or Firm* — Thrive IP

(57) ABSTRACT

A system of ensuring personal safety of an individual includes a concealable device and a deterrent device, the concealable device for tracking the location of the individual and to alert authorities of an emergency situation upon hearing an activation expression from the individual, and the deterrent device being in wireless communication with the concealable device to audibly warn an assailant upon activation of the concealable device by the activation expression.

24 Claims, 4 Drawing Sheets

PERSONAL SAFETY SYSTEM

BACKGROUND OF THE DISCLOSURE

Common forms of outdoor exercise and recreation include running, jogging, walking, hiking, kayaking, bicycling, et cetera. Unfortunately, many independent outdoor activities carry a risk of harassment and even abduction in relatively isolated areas, particularly for more vulnerable participants such as juveniles or females. Some studies, for instance, indicate that a significant majority of women runners have reported being harassed while running with as many as one in three stating that they had been followed by suspicious persons in vehicles, bikes, or on foot.

Intimidated or concerned runners, hikers, and the like will sometimes contact authorities such as the police, or perhaps family members or friends, using their mobile cellular phones. However, many outdoor enthusiasts, particularly runners, do not want to—or cannot—carry phones, which tend to be inconvenient or disruptive. Furthermore, criminals are aware that phones can be used to contact authorities and to locate an abductee, so a criminal immediately will discard an abductee's phone and other electronic devices that might be used to track the victim.

Various efforts have been made to increase safety and security for outdoor enthusiasts who wish to or must exercise alone. Some safety products that are less burdensome than cell phones can be carried by users on running trails and the like. However, known devices require that a user press and hold an alert button to activate such a device. Accordingly, the user must carry the device literally in hand to ensure that it is available immediately when needed. Not only is this cumbersome and undesirable—particularly if the user needs both hands (e.g., in a climbing scenario)—but the user typically has to hold the button for approximately three (3) seconds to activate the device to prevent false alarms that might be triggered from accidentally momentarily touching the button. In a surprise confrontation, however, a victim may not have multiple seconds to press and hold the alert button to activate the device.

What is needed in the industry is a compact, unobtrusive safety apparatus that can be used by outdoor enthusiasts to deter criminals, but, if necessary, the apparatus should be equipped to automatically alert authorities to an incident location and dire situation. Moreover, the needed apparatus should not be easily discoverable and removed from the user.

SUMMARY OF THE DISCLOSURE

The present disclosure generally provides a wearable system having, on one hand, deterrence and decoy functions, and on the other hand, authority notification and tracking functions. Aspects according to the disclosure may include a concealable voice-activated unit with an ultra-compact microcontroller and a global positioning system (GPS) locating device that acquires location information, and a modem that sends information to an emergency call center such as "911" in the United States, all of which can be concealed in a hidden pocket of running tights, shorts, shirt, or sports bra. The voice-activated unit can also activate a separate unit that produces an audible alarm.

More particularly, the voice-activated unit of the concealable system can be activated by an activation phrase or word. This activation phrase or word may be pre-programmed in the system or chosen by the user. Upon hearing the word or phrase and following activation, the unit will immediately send alert information to a 911 emergency dispatch system, for instance, for relay to police authorities. Moreover, once the system is voice-activated, it simultaneously sends a wireless signal to a secondary device worn by the individual. The activated secondary device immediately plays an audible alarm to warn a stalker that authorities have been alerted. In one aspect, the secondary device will be intentionally visible and clearly heard. However, if the attacker does not flee after the audible warning and tries to dispose of the secondary device, the attempted destruction or disposal of the secondary device will have no effect on the primary device, which will still transmit the user's GPS position to the emergency call center, e.g., at fifteen (15) second intervals. Moreover, the primary device will send audio recorded clips from the incident after the initial alarm, which will permit the user to speak and relay critical information to first responders without needing a separate cell phone.

In one embodiment of the disclosure, a personal safety system may include a primary device carried by a user, preferably concealed about the user, the primary device having a controller (which may be micro-controller), a microphone, and a transmitter disposed therein (such as a modem and a GPS module), the controller being in electronic communication with the microphone and the transmitter and being programmed to receive an activation expression from the user, the microphone being configured to hear the activation expression, the controller operable to determine a location of the user and send the location with an alert via the transmitter upon hearing the activation expression; and a deterrent device carried, preferably visibly, by the user spaced apart from and in electronic communication with the primary device, the deterrent device being programmed to emit an audible warning when the controller receives the activation expression. In this embodiment, the activation expression may be a word, phrase, or sound chosen by the user, the controller being configured to record the word, phrase, or sound.

Also in this aspect, the primary device is programmed to wirelessly send the alert to emergency authorities. Further, the primary device may be programmed to wirelessly send the alert to emergency authorities at the expiration of a user-specified period of time without activation of the deterrent device. Also, the deterrent device may be configured to alternately sound an alarm and play an audible warning to other persons proximate the user.

In another embodiment, a personal safety system according to the disclosure may include a primary device concealed upon a user, the primary device having a micro-controller, a microphone, and a transmitter disposed therein (such as a modem and a GPS module), the micro-controller being in electronic communication with the microphone and the transmitter and being programmed to receive an activation sound from the user, the microphone being configured to hear the activation sound, the controller operable to determine a location of the user and send the location with an alert via the transmitter upon hearing the activation sound; and a deterrent device carried, preferably visibly, by the user spaced apart from and in electronic communication with the primary device, the deterrent device being programmed to emit an audible warning when the controller receives the activation sound.

In still another embodiment, a personal safety system may include a primary device carried, preferably concealed, by a user, the primary device having a micro-controller, a cellular modem, a microphone, and a GPS acquisition module disposed therein, the controller being in electronic communication with the microphone, cellular modem, and the GPS acquisition module and being programmed to receive an activation expression from the user, the microphone being configured to hear the activation expression, the controller operable to acquire location of the user via the GPS acqui- sition module and send the location with an alert via the cellular modem or a satellite upon hearing the activation expression; and a deterrent device carried by the user, preferably visibly, spaced apart from and in wireless elec- tronic communication with the primary device, the deterrent device being programmed to emit an audible warning when the controller receives the activation expression.

Also in this aspect, the primary device is programmed to wirelessly send the alert to emergency authorities at an expiration of a user-specified period of time without acti- vation of the deterrent device. Still further, the primary device may be programmed to wirelessly send the alert to emergency authorities if the primary device exceeds a user- specified geographic area. Additionally, the deterrent device may be configured to alternately sound an alarm and play an audible warning to other persons proximate the user.

Preferably, the primary device in this aspect cannot be powered off after hearing the activation expression. Still further, the primary device, upon hearing the activation expression, will record audio and relay the audio to emer- gency authorities. Various antennae may be included in the primary device to boost transmission capabilities. Also in this aspect, the controller may be configured to record the activation expression, which can be recorded by the user and/or the activation expression may have been program- matically embedded in the microcontroller (not subse- quently recorded by the user).

Additional objects and advantages of the present subject matter are set forth in, or will be apparent to, those of ordinary skill in the art from the description herein. Also, it should be further appreciated that modifications and varia- tions to the specifically illustrated, referenced, and discussed features, processes, and elements hereof may be practiced in various embodiments and uses of the disclosure without departing from the spirit and scope of the subject matter. Variations may include, but are not limited to, substitution of equivalent means, features, or steps for those illustrated, referenced, or discussed, and the functional, operational, or positional reversal of various parts, features, steps, or the like. Those of ordinary skill in the art will better appreciate the features and aspects of the various embodiments, and others, upon review of the remainder of the specification.

BRIEF DESCRIPTION OF THE DRAWINGS

A full and enabling disclosure of the present subject matter, including the best mode thereof directed to one of ordinary skill in the art, is set forth in the specification, which refers to the appended figures, wherein.

DETAILED DESCRIPTION OF THE DISCLOSURE

Figure 1:
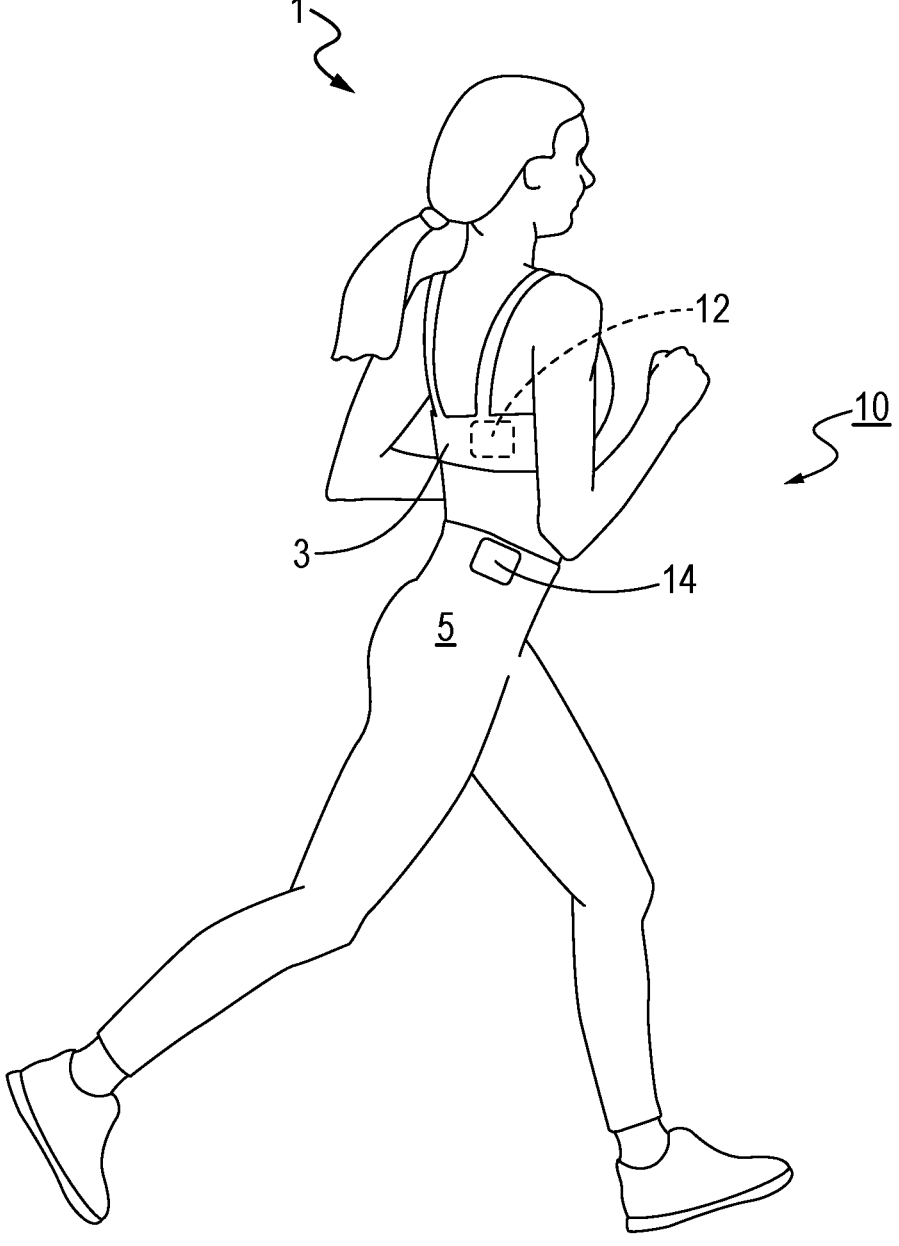
FIG. 1 is a perspective view of a personal safety system in an intended use scenario according to an embodiment of the disclosure.

As required, detailed embodiments are disclosed herein; however, the disclosed embodiments are merely exemplary and may be embodied in various forms. Therefore, specific structural and functional details disclosed herein are not to be interpreted as limiting, but merely as a basis for the claims and as a representative basis for teaching one skilled in the art to variously employ the exemplary embodiments of the present disclosure, as well as their equivalents.

Unless defined otherwise, all technical and scientific terms used herein have the same meaning as is commonly understood by one of ordinary skill in the art to which this disclosure belongs. In the event that there is a plurality of definitions for a term or acronym herein, those in this section prevail unless stated otherwise.

Internet Capable Device means including but not limited to portable, non-portable, wearable, non-wearable, embed- ded, non-embedded, automated, human controlled devices, or software and combinations thereof, capable of using a proxy.

"User," "Computing Device," or "User Device" means any portable, non-portable, wearable, non-wearable, embed- ded, non-embedded, automated, human controlled device, or software that can access the Internet.

Wherever the phrases "for example," "such as," "includ- ing," and the like are used herein, the phrase "and without limitation" is understood to follow unless explicitly stated otherwise. Similarly, "an example," "exemplary," and the like are understood to be non-limiting.

The term "substantially" allows for deviations from the descriptor that do not negatively impact the intended pur- pose. Descriptive terms are understood to be modified by the term "substantially" even if the word "substantially" is not explicitly recited.

The term "about" when used in connection with a numeri- cal value refers to the actual given value, and to the approximation to such given value that would reasonably be inferred by one of ordinary skill in the art, including approximations due to the experimental and or measurement conditions for such given value.

Unless the context clearly requires otherwise, throughout the description and the claims, the words "comprise", "com- prising", and the like are to be construed in an inclusive sense as opposed to an exclusive or exhaustive sense; in the sense of "including, but not limited to."

The terms "comprising" and "including" and "having" and "involving" (and similarly "comprises", "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, et cetera. Thus, for example, "a device having components a, b, and c" means that the device includes at least components a, b, and c. Similarly, the phrase: "a method involving steps a, b, and c" means that the method includes at least steps a, b, and c.

Where a list of alternative component terms is used, e.g., "a structure such as 'a', 'b', 'c', 'd' or the like", or "a" or b", such lists and alternative terms provide meaning and context for the sake of illustration, unless indicated otherwise. Also, relative terms such as "first," "second," "third," "front," and "rear" are intended to identify or distinguish one component or feature from another similar component or feature, unless indicated otherwise herein.

The various embodiments of the disclosure and/or equivalents falling within the scope of the present disclosure overcome or ameliorate at least one of the disadvantages of the prior art.

Detailed reference will now be made to the drawings in which examples embodying the present subject matter are shown. The detailed description uses numerical and letter designations to refer to features of the drawings. The drawings and detailed description provide a full and written description of the present subject matter, and of the manner and process of making and using various exemplary embodiments, so as to enable one skilled in the pertinent art to make and use them, as well as the best mode of carrying out the exemplary embodiments. The drawings are not necessarily to scale, and some features may be exaggerated to show details of particular components. Thus, the examples set forth in the drawings and detailed descriptions are provided by way of explanation only and are not meant as limitations of the disclosure. The present subject matter thus includes any modifications and variations of the following examples as come within the scope of the appended claims and their equivalents.

Turning now to FIG. 1 a runner 1 is shown wearing a personal safety system ("PSS") broadly designated by element number 10. The PSS 10 may include a concealed primary unit or tracking device 12, which is an internet capable device, and a separate, visible, secondary or deterrent device 14. Here, the primary device 12 is hidden or embedded in a pocket of a sports bra 3 worn by the individual 1, and the secondary device 14 is clipped or attached elsewhere, such as to another item of clothing 5 like jogging pants. Alternatively, the primary device 12 could be concealed in the jogging pants 5 and the secondary device 14 could be attached to the sports bra 3, or still other wearable garment locations could be chosen by the user 1. Additionally or alternatively, the secondary device 14 could be carried or worn on a lanyard or a belt, preferably as long as the secondary device 14 remains visible for reasons explained below.

Figure 2:
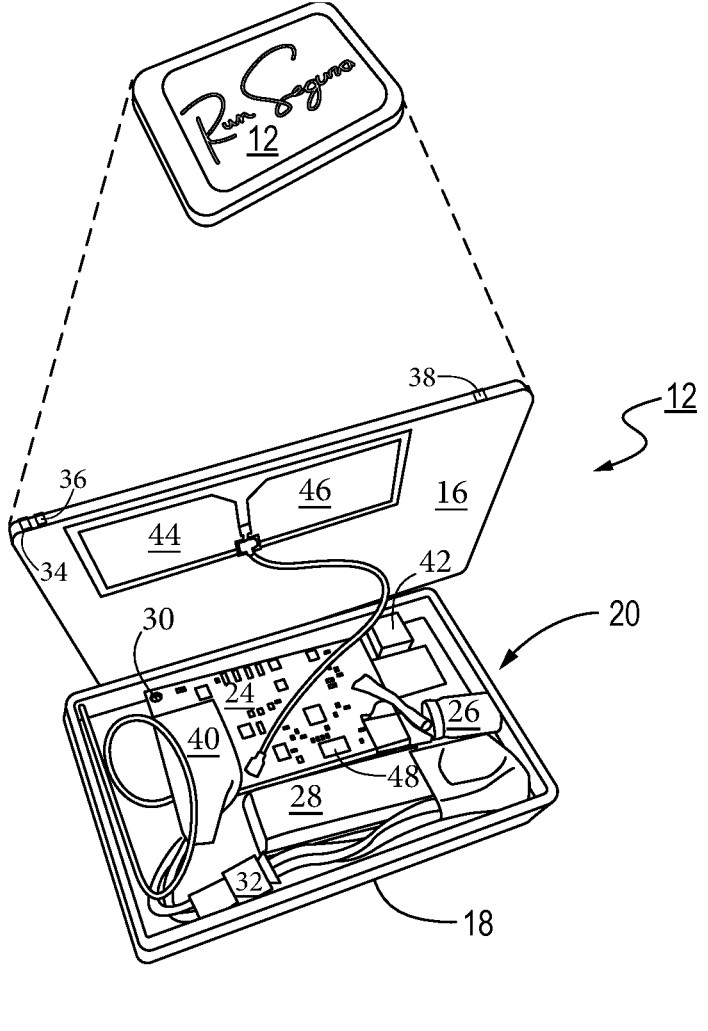
FIG. 2 are top perspective views of a concealable primary unit and a visible secondary unit of the personal safety system as in FIG. 1, particularly showing the primary unit in an opened state in an enlarged view.
Figure 2:
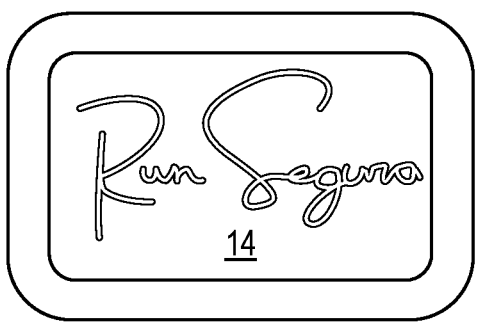

The tracking device 12 is shown most clearly in FIG. 2. In this example, the device 12 includes a top portion or lid 16 opened in an enlarged view to reveal various electronic components 20 carried in a container or bottom portion 18—e.g., a microcontroller 24; a battery 26; a haptic feedback device 28; a microphone 30; a data/audio transmission and charging connector 32; control buttons or switches 34, 36; one or more lights 38; a transmitter or GPS modem unit 40; a microcontroller memory or secure digital (SD) memory chip 42 to record user preferences, activation phrases, et cetera; antennae 44, 46; and a subscriber identity module (SIM) slot for a SIM card (preferably a micro- or nano-card) or an on-board chip 48, which are discussed below. Due to these relatively small micro-electronics 20, the tracking device 12 is sufficiently slim, lightweight, and compact to be hidden, for instance, in the pocket of the sports bra 3 as introduced in FIG. 1 above, with the secondary device 14 being worn by the user 1 in a different visible location, i.e., spaced apart from the concealed device 12. Although not necessarily to scale in these drawings, the devices 12, 14—particularly device 12—are relatively small, e.g., the device 12 is preferably smaller than the palm of an adult female hand, still more preferably, the device 12 is miniaturized and may be smaller than a credit card in width, length, and thickness.

With continued reference to FIG. 2, the primary tracking device 12 is wirelessly connected to the secondary device 14. When both devices 12, 14 are activated, as will be explained in greater detail with respect to FIG. 3 below, the tracking device 12 will be placed in a "listening" mode and waiting for an activation expression, phrase, or word spoken by the user 1.

Upon hearing the activation phrase, the tracking device 12 will continue listening and transmitting sounds of an incident while simultaneously activating the secondary device 14, which will emit an audible alarm and/or spoken warning. Preferably, the audible alarm from the secondary device 14, in addition to sounding a warning siren or bell, will intermittently warn an attacker that authorities have been contacted and that the location of the incident is known, as studies indicate that many potential criminals will flee a scene when alarms, lights, and the like draw attention to them. If, however, the audible alarm does not deter the attacker, the tracking device 12—which also already secretly alerted authorities—will continue to record sounds, voices, and the like from the incident and will continue to relay location to the authorities. Even if the attacker disposes of the secondary device 14 or destroys it—as the secondary device 14 doubles as a decoy for those criminals looking to dispose of electronic devices—the hidden tracking device 12 will continue to operate.

Figure 3:
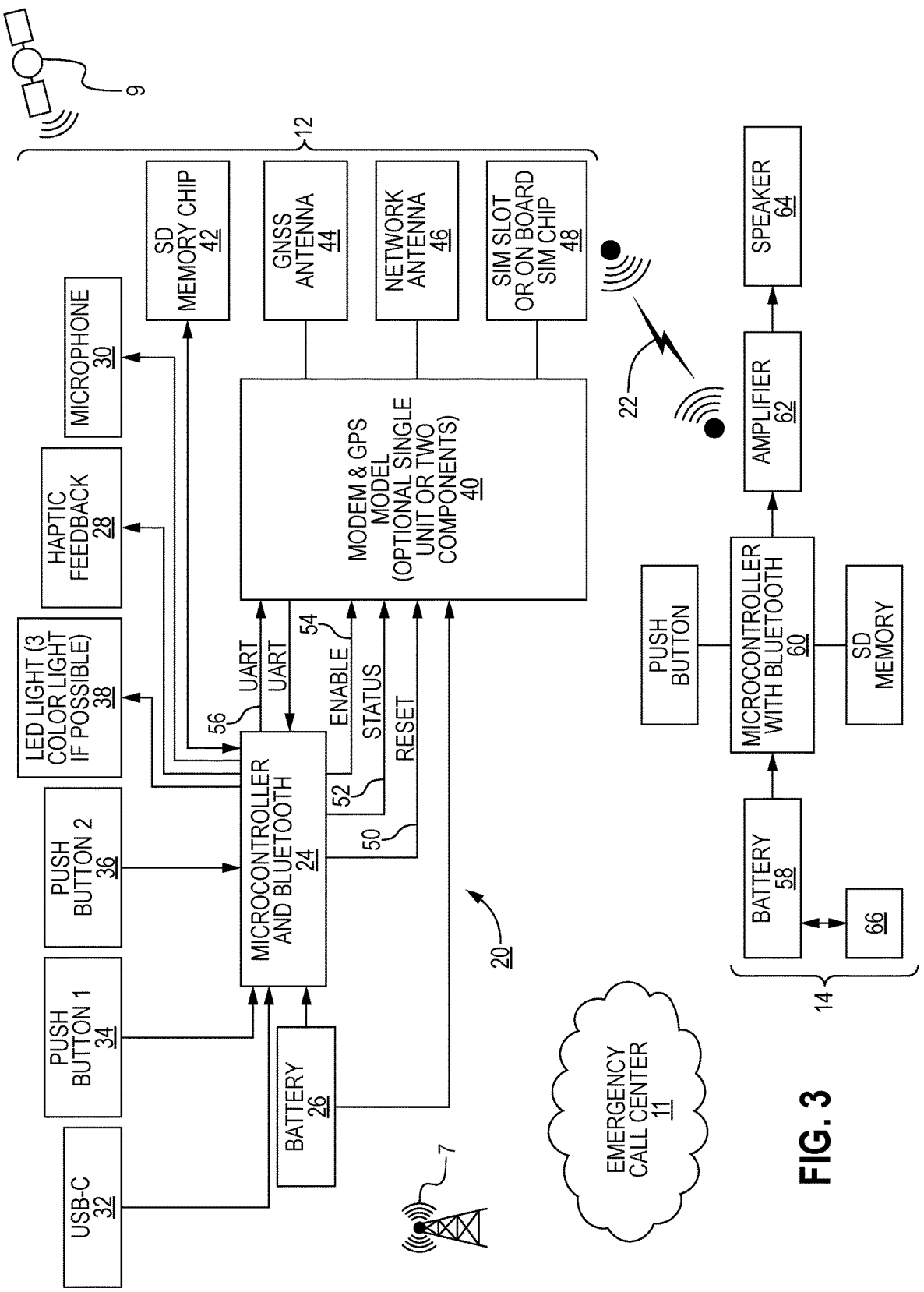
FIG. 3 is a diagrammatic view of various components and aspects of the personal safety system as in FIGS. 1 and 2.

FIG. 3 is a diagrammatic view of various components and operations of the PSS 10. As introduced above, the tracking device 12 is equipped to transmit, e.g., cellular data 7 or satellite 9 to an emergency services center 11, such as a 911 call center or to police authorities, and to simultaneously wirelessly communicate with the secondary device 14 as indicated by element number 22. More particularly, the electronic features and components 20 of the tracking device 12 may include, as introduced above, the microcontroller 24, the battery 26, the haptic feedback device 28, the microphone 30, the data/audio transmission and charging connector 32, the control buttons 34, 36, the lights 38, the transmitter/GPS modem unit 40, the microcontroller SD memory chip 42, the antennae 44, 46, and the SIM card/on-board chip 48 to provide cellular network service for cellular data 7. Preferably, the microcontroller 24 is equipped with wireless capabilities such as Bluetooth® brand wireless technology, and the microphone 30 will be sufficiently sensitive to hear nearby voices, particularly the voice of the user 1, even with the tracking device 12 concealed in a pocket or under a layer of clothing.

The connector 32 of the tracking device 12 shown in FIG. 3 may be a Universal Serial Bus, Type-C, 24-pin connector, commonly known as USB-C, which facilitates fast charging speeds and is capable of transmitting data, video, and audio signals and the like. The lights 38 may be three differently colored light emitting diodes (LEDs) or a single LED capable of emitting different colors (e.g., green, yellow, red) to inform the user 1 about the battery 26 and operational status.

FIG. 3 further shows exemplary components of the secondary device 14, which again, when the PSS 10 is active, is in wireless communication 22 with the primary device 12. In this example, the secondary device 14 may include a battery 58, a microcontroller 60 (preferably equipped with wireless communication capabilities such as Bluetooth® brand wireless technology), an amplifier 62, a speaker 64, a charging port 66 for, e.g., a USB-C cable, and a power switch or button 68. Briefly, the microcontroller 60 of the secondary device 14 is in wireless communication 22 with the microcontroller 24 of the primary device 12, such that, when activated by the activation phrase or sound, the speaker 64 will broadcast an alarm and audible warnings.

By way of example operation with reference to FIGS. 1-3, the user 1 will disconnect the primary and secondary devices 12, 14 from their respective charging ports 32, 66 and take the PSS 10 to an outdoor area. The user 1 will turn on the devices 12, 14 by pressing their respective power buttons 34, 68 until the LED 38 illuminates. The user 1 will briefly wait for the device 12 to confirm wireless connectivity 22 with the device 14, e.g., the green LED 38 may flash three times, although various color combinations and sequences can be programmed depending on manufacturer and user desires. The device 12 then confirms cellular connectivity 7 and acquires GPS position via satellite 9, which again can be indicated to the user 1 by another color combination and sequence, such as the green and yellow LED 38 alternately flashing three times. Additionally or alternatively, to further confirm connectivity 7, 22, the secondary device 14 can provide an audible sound from its speaker 64 and the haptic device 28 of the primary device 12 can vibrate to assure the user 1 that the PSS 10 is properly functioning and ready for use.

Turning again to FIG. 3, any time the devices 12, 14 are powered on, the user 1 can press the button 36 for a predetermined number of seconds, which will cause the microcontroller 24 to enter into a coding mode. The coding mode will allow user to modify some user settings of the modem/GPS 40 via interconnectivity of the reset 50, status 52, enable 54, and universal asynchronous receiver/transmitter (UART) 56 aspects/devices of the PSS 10. The coding mode may be indicated to the user 1 by a specific color combination from the LED 38 and/or an audible prompt inviting the user 1 to input a preferred settings such as geographic area for activity. The user will also have ability to record activation sound, word, or phrase such as "Help, Help," although the activation sound is not limited to words and could be a whistle, a clapping pattern, et cetera. Once the preferred activation sound or phrase is recorded in the SD memory chip 42, the user 1 can press the button 36 once more, and the PSS 10 will acknowledge the activation sound or phrase and begin "listening" for that phrase until the primary device 12 is powered off.

The following Table 1 shows exemplary code that causes the primary device 12 to listen for the activation sound or phrase.

TABLE 1

```
void loop( ) {
    //Main Audio listen loop
    const int16_t *buffer = audio_rec_get_new_buffer( );
    if (buffer) {
        int32_t keyword_index;
        const status_t status = audio_activation_phrase_process(handle,
buffer, &keyword_index);
        if (status != STATUS_SUCCESS) {
            Serial.print("process failed with ");
            Serial.println(status_to_string(status));
            while (1)
                ;
        }
        if (keyword_index != -1) {
            turnBGmoduleOn( );
            turnModemOn( );
            int result;
            CountWakeTimes = 1 + CountWakeTimes;
            Serial1.println("at+cfun=1");
```

TABLE 1-continued

```
            result = Modem WaitResponse("OK");
            Serial.println("Activation Phrase Happend " +
            String(CountWakeTimes) + " times.");
            GPSon( );
            getGPS( );
            HeaderSet( );
            turnModemOn( );
            HttpPostAlarm( ); }
}
```

The user 1 is now ready to conceal the primary device 12 in a hidden pocket of clothing, such as the exemplary sports top 3 shown in FIG. 1, and also strap or clip the secondary device 14 to a lanyard or to another portion of clothing or gear, such as the exemplary running pants 5 in FIG. 1. The user 1 can then proceed with her run, walk, or other outdoor activity.

If an emergency arises during the outdoor activity, the user 1 will immediately say the activation phrase, such as "Help, attack" as noted in the example above, which will immediately activate the primary device 12. As further shown in FIG. 3, upon hearing the activation phrase, the device 12 will simultaneously and immediately obtain the GPS position of the primary device 12 (and hence the user 1) by the antenna 44, which is preferably a global navigation satellite systems (GNSS) antenna; wirelessly send the GPS position and emergency call to the 911 call center 11 or to police authorities directly via cellular data 7 and simultaneously activate the secondary device 14, which will emit an audible alarm through its speaker 64. By way of example, the audible alarm may be a siren along with a voice stating that the police have been contacted. Further, the primary device 12 will vibrate via the haptic feedback device 28 to let the user 1 secretly know that the call for help was received by the call center 11.

Still further, in some aspects the tracking device 12 of FIG. 3 may be programmed by the user 1 to send an alert to the call center 11 after a specified period of time, even if the user 1 does not activate the device 12 using an activation expression. For instance, the user 1 may decide to run for one hour. After, e.g., seventy minutes, if the user 1 does not cancel the programming, the device 12 may vibrate via the haptic device 28 to remind the user 1 to cancel the programming, If device 12 receives no input within another, e.g., two minutes, the device 12 will contact authorities, which can be programmed without activating the secondary device 14, assuming a worst case abduction scenario has already occurred and the user 1 is unable to speak the activation expression.

As further shown in FIG. 3, the primary device 12 will record audio and continue to send position and audio content to the call center 11. The primary device 12 also will send updated GPS position, e.g., every fifteen (15) or twenty (20) seconds, or other default or user-selected interval. In one aspect, the power button 34 of the primary device 12 will be disabled after the alarm has been activated. Further, the alarm will remain active until a user code is provided to the call center 11 by the user 1, or until authorities cancel the alarm. Notably, the memory chip 42 and recordings may be used as evidence in a court of law.

Figure 4:
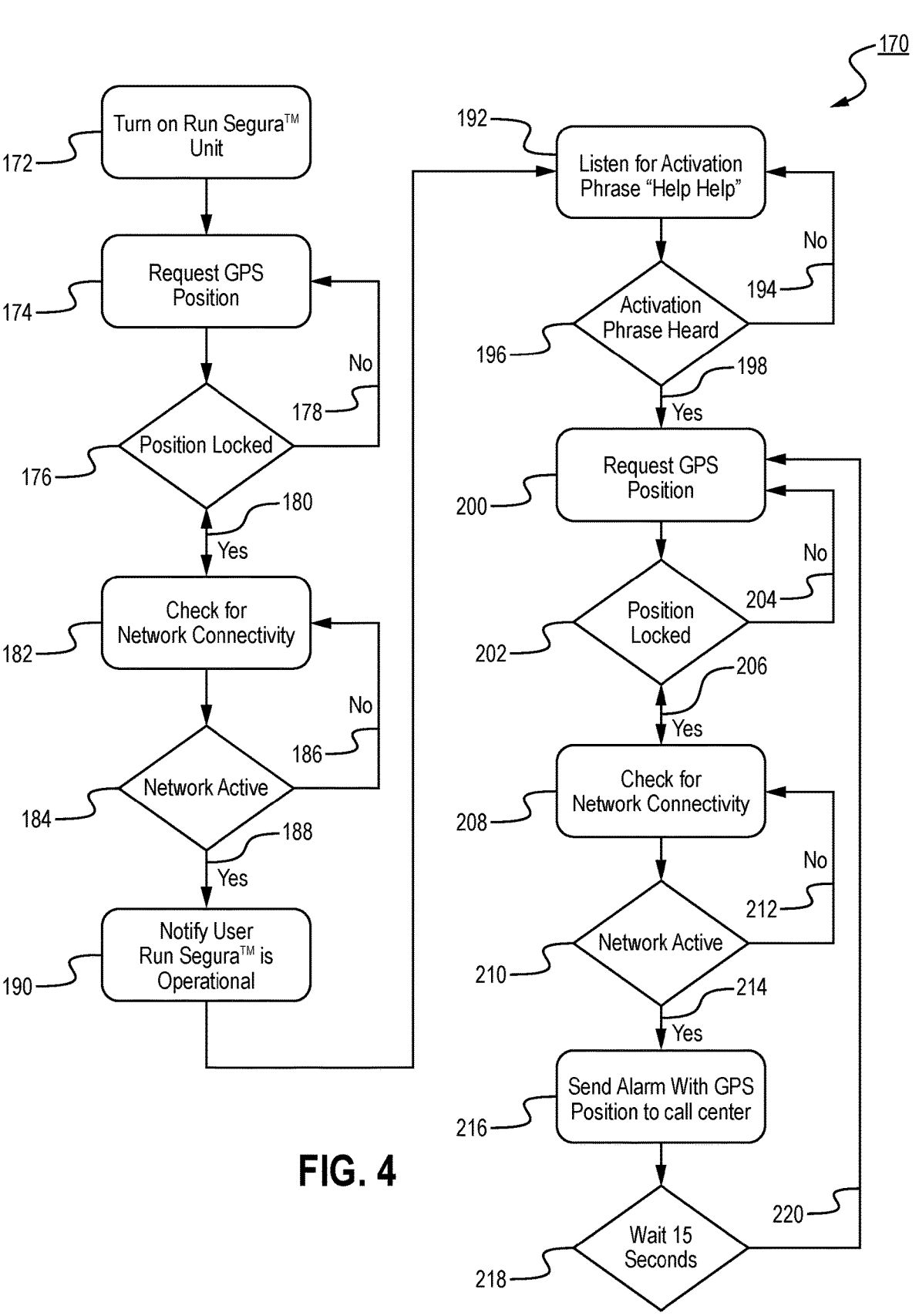
FIG. 4 is a flow chart showing an exemplary operation of a system according to an aspect of the disclosure.

FIG. 4 shows an exemplary example operation in which a personal safety system according to the disclosure is powered on and is waiting for activation, as indicated broadly by element number 170. Here, the PSS 10 as introduced above, which is available under the brand name Run Segura™, is shown being powered on at step 172 and searching for or requesting its GPS coordinates at step 174. If the position cannot be determined at POSITION LOCKED step 176, the system will request the position again at NO step 178. Once the position is received at YES step 180, the system will check for NETWORK CONNEC-TIVITY at step 182 to ascertain NETWORK ACTIVE at step 184. If connectivity is not established at NO step 186, the system will repeat step 182 until connectivity is established at YES step 188 at which point the system will NOTIFY USER RUN SEGURA™ IS OPERATIONAL at step 190. The system will then, for example, LISTEN FOR ACTIVATION PHRASE "HELP HELP" at step 192. Until the system hears the activation phrase it will continue looping at NO step 194 until ACTIVATION PHRASE HEARD at step 196. At this activation stage, the PSS 10 will REQUEST GPS POSITION at step 200. If the position cannot be determined at POSITION LOCKED step 202, the system will request the position again at NO step 204. Once the position is received at YES step 206, the system will check for NETWORK CONNECTIVITY at step 208 to ascertain NETWORK ACTIVE at step 210. If connectivity is not established at NO step 212, the system will repeat step 208 until connectivity is established at YES step 214 at which point the system will SEND ALARM WITH GPS POSITION TO CALL CENTER at step 216. The PSS 10 will wait for fifteen (15) seconds, for example, and then loop at step 220 repeating steps 200 through 220.

Exemplary embodiments of the disclosure may include but are not limited to:

EMBODIMENT 1: A personal safety system comprising a primary device carried by a user, the primary device having a controller, a microphone, and a transmitter disposed therein, the controller being in electronic communication with the microphone and the transmitter and being programmed to receive an activation expression from the user, the microphone being configured to hear the activation expression, the controller operable to determine a location of the user and send the location with an alert via the transmitter upon hearing the activation expression; and a deterrent device carried by the user spaced apart from and in electronic communication with the primary device, the deterrent device being programmed to emit an audible warning when the controller receives the activation expression.

EMBODIMENT 2: The personal safety system as in Embodiment 1, wherein the primary device is concealed about the user.

EMBODIMENT 3: The personal safety system as in Embodiments 1 or 2, wherein the activation expression is a word or phrase chosen by the user, the controller being configured to record the word or phrase, the activation expression being pre-recorded by the user or being programmatically pre-recorded and embedded in the controller.

EMBODIMENT 4: The personal safety system as in Embodiments 1, 2, or 3, wherein the activation expression is sound chosen by the user, the controller being configured to record the sound.

EMBODIMENT 5: The personal safety system as in any of the foregoing embodiments, wherein the primary device is programmed to wirelessly send the alert to emergency authorities.

EMBODIMENT 6: The personal safety system as in any of the foregoing embodiments, wherein the primary device is programmed to wirelessly send the alert to emergency authorities at the expiration of a user-specified period of time without activation of the deterrent device.

EMBODIMENT 7: The personal safety system as in any of the foregoing embodiments, wherein the controller is a micro-controller.

EMBODIMENT 8: The personal safety system as in any of the foregoing embodiments, wherein the deterrent device is carried visibly by the user.

EMBODIMENT 9: The personal safety system as in any of the foregoing embodiments, wherein the deterrent device is configured to alternately sound an alarm and play an audible warning to other persons proximate the user.

EMBODIMENT 10: The personal safety system as in any of the foregoing embodiments, wherein the transmitter is a GPS device.

EMBODIMENT 11: A personal safety system comprising a primary device concealed upon a user, the primary device having a micro-controller, a microphone, and a transmitter disposed therein, the micro-controller being in electronic communication with the microphone and the transmitter and being programmed to receive an activation sound from the user, the microphone being configured to hear the activation sound, the controller operable to determine a location of the user and send the location with an alert via the transmitter upon hearing the activation sound; and a deterrent device carried by the user spaced apart from and in electronic communication with the primary device, the deterrent device being programmed to emit an audible warning when the controller receives the activation sound.

EMBODIMENT 12: The personal safety system as in Embodiment 11, wherein the deterrent device is carried visibly by the user.

EMBODIMENT 13: A personal safety system comprising a primary device carried by a user, the primary device having a micro-controller, a cellular modem, a microphone, and a GPS acquisition module disposed therein, the controller being in electronic communication with the microphone, cellular modem, and the GPS acquisition module and being programmed to receive an activation expression from the user, the microphone being configured to hear the activation expression, the controller operable to acquire location of the user via the GPS acquisition module and send the location with an alert via the cellular modem or a satellite upon hearing the activation expression; and a deterrent device carried by the user spaced apart from and in wireless electronic communication with the primary device, the deterrent device being programmed to emit an audible warning when the controller receives the activation expression.

EMBODIMENT 14: The personal safety system as in Embodiment 13, wherein the primary device is concealed about the user.

EMBODIMENT 15: The personal safety system as in Embodiments 13 or 14, wherein the primary device is programmed to wirelessly send the alert to emergency authorities at an expiration of a user-specified period of time without activation of the deterrent device.

EMBODIMENT 16: The personal safety system as in Embodiments 13, 14, or 15, wherein the primary device is programmed to wirelessly send the alert to emergency authorities if the primary device exceeds a user-specified geographic area.

EMBODIMENT 17: The personal safety system as in any one of the Embodiments 13 through 16, wherein the deterrent device is carried visibly by the user.

EMBODIMENT 18: The personal safety system as in any one of the Embodiments 13 through 17, wherein the deterrent device is configured to alternately sound an alarm and play an audible warning to other persons proximate the user.

EMBODIMENT 19: The personal safety system as in any one of the Embodiments 13 through 18, wherein the primary device cannot be powered off after hearing the activation expression.

EMBODIMENT 20: The personal safety system as in any one of the Embodiments 13 through 19, wherein the primary device, upon hearing the activation expression, will record audio and relay the audio to emergency authorities.

EMBODIMENT 21: The personal safety system as in any one of the Embodiments 13 through 20, wherein the micro-controller is configured to record the activation expression.

EMBODIMENT 22: The personal safety system as in any one of the Embodiments 13 through 21, wherein the activation expression is recorded by the user.

EMBODIMENT 23: The personal safety system as in any one of the Embodiments 13 through 22, wherein the activation expression is programmatically embedded in the micro-controller.

EMBODIMENT 24: The personal safety system as in any one of the Embodiments 13 through 23, further comprising an antenna disposed in the primary device.

While the present subject matter has been described in detail with respect to specific embodiments thereof, it will be appreciated that those skilled in the art, upon attaining an understanding of the foregoing may readily produce altera-tions to, variations of, and equivalents to such embodiments. Accordingly, the scope of the present disclosure is by way of example rather than by way of limitation, and the subject disclosure does not preclude inclusion of such modifica-tions, variations and/or additions to the present subject matter as would be readily apparent to one of ordinary skill in the art.

The invention claimed is:

1. A personal safety system, comprising:
a primary device carried concealed by a user, the primary device having a controller, a microphone, and a trans-mitter disposed therein, the controller being in elec-tronic communication with the microphone and the transmitter and being programmed to receive an acti-vation expression from the user, the microphone being configured to hear the activation expression, the con-troller operable to determine a location of the user and send the location with an alert to an emergency call center via the transmitter upon hearing the activation expression; and
a deterrent device visibly carried by the user spaced apart from and in electronic communication with the primary device, the deterrent device being programmed to emit an audible warning when the controller receives the activation expression.

2. The system of claim 1, wherein the primary device is concealed about the user.

3. The system of claim 1, wherein the activation expres-sion is pre-recorded by the user, the controller being con-figured to record the activation expression.

4. The system of claim 1, wherein the activation expres-sion is programmatically embedded in the controller.

5. The system of claim 1, wherein the activation expres-sion is sound chosen by the user, the controller being configured to record the sound.

6. The system of claim 1, wherein the primary device is programmed to wirelessly send the alert to emergency authorities at the expiration of a user-specified period of time without activation of the deterrent device.

7. The system of claim 1, wherein the controller is a micro-controller.

8. The system of claim 1, wherein the deterrent device is carried visibly by the user.

9. The system of claim 1, wherein the deterrent device is configured to alternately sound an alarm and play an audible warning to other persons proximate the user.

10. The system of claim 1, wherein the transmitter is a modem and a GPS device.

11. A personal safety system, comprising: a primary device concealed upon a user, the primary device having a micro-controller, a microphone, and a transmitter disposed therein, the micro-controller being in electronic communi-cation with the microphone and the transmitter and being programmed to receive an activation sound from the user, the microphone being configured to hear the activation sound, the controller micro-controller operable to determine a location of the user and send the location with an alert to an emergency call center via the transmitter upon hearing the activation sound; and
a deterrent device visibly carried by the user spaced apart from and in electronic communication with the primary device, the deterrent device being programmed to emit an audible warning when the micro-controller receives the activation sound.

12. The system of claim 11, wherein the deterrent device is carried visibly by the user.

13. A personal safety system, comprising: a primary device carried concealed by a user, the primary device having a micro-controller, a cellular modem, a microphone, and a GPS acquisition module disposed therein, the micro-controller being in electronic communication with the microphone, cellular modem, and the GPS acquisition mod-ule and being programmed to receive an activation expres-sion from the user, the microphone being configured to hear the activation expression, the micro-controller operable to acquire location of the user via the GPS acquisition module and send the location with an alert to an emergency call center via the cellular modem or a satellite upon hearing the activation expression; and
a deterrent device visibly carried by the user spaced apart from and in wireless electronic communication with the primary device, the deterrent device being programmed to emit an audible warning when the micro-controller receives the activation expression.

14. The system of claim 13, wherein the primary device is concealed about the user.

15. The system of claim 13, wherein the primary device is programmed to wirelessly send the alert to emergency authorities at an expiration of a user-specified period of time without activation of the deterrent device.

16. The system of claim 13, wherein the primary device is programmed to wirelessly send the alert to emergency authorities if the primary device exceeds a user-specified geographic area.

17. The system of claim 13, wherein the deterrent device is carried visibly by the user.

18. The system of claim 13, wherein the deterrent device is configured to alternately sound an alarm and play an audible warning to other persons proximate the user.

19. The system of claim 13, wherein the primary device cannot be powered off after hearing the activation expres-sion.

20. The system of claim 13, wherein the primary device, upon hearing the activation expression, will record audio and relay the audio to emergency authorities.

21. The system of claim 13, wherein the micro-controller is configured to record the activation expression.

22. The system of claim 13, wherein the activation expression is recorded by the user.

23. The system of claim 13, wherein the activation expression is programmatically embedded in the microcontroller.

24. The system of claim 13, further comprising an antenna disposed in the primary device.

* * * * *